(12) United States Patent
Kurahashi et al.

(10) Patent No.: US 9,046,855 B2
(45) Date of Patent: Jun. 2, 2015

(54) IMAGE FORMING APPARATUS

(75) Inventors: Hideyuki Kurahashi, Toyokawa (JP); Osamu Okada, Toyokawa (JP); Teruo Nagashima, Toyohashi (JP); Kenji Tsuru, Hachioji (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 103 days.

(21) Appl. No.: 13/493,071

(22) Filed: Jun. 11, 2012

(65) Prior Publication Data

US 2012/0320387 A1 Dec. 20, 2012

(30) Foreign Application Priority Data

Jun. 16, 2011 (JP) ................................. 2011-134527

(51) Int. Cl.
*G06F 15/00* (2006.01)
*G03G 15/00* (2006.01)
*H04N 1/00* (2006.01)

(52) U.S. Cl.
CPC .... *G03G 15/602* (2013.01); *G03G 2215/00236* (2013.01); *H04N 1/00522* (2013.01); *H04N 1/00527* (2013.01); *H04N 1/0062* (2013.01); *H04N 1/00631* (2013.01); *H04N 2201/0094* (2013.01)

(58) Field of Classification Search
CPC .......................... G03G 15/602; H04N 1/00522
USPC ......................................................... 399/405
See application file for complete search history.

(56) References Cited

U.S. PATENT DOCUMENTS

| 6,314,267 B1* | 11/2001 | Kida ............................. 399/405 |
| 2006/0215181 A1 | 9/2006 | Sugimoto et al. |
| 2008/0175640 A1 | 7/2008 | Akiyama |

FOREIGN PATENT DOCUMENTS

| CN | 1838059 A | 9/2006 |
| JP | 2007134534 | 5/1995 |
| JP | 2007146596 | 6/1995 |
| JP | 8-328334 A | 12/1996 |
| JP | 2000330350 A | 11/2000 |
| JP | 2005-031550 A | 2/2005 |
| JP | 2005-115084 A | 4/2005 |
| JP | 2008176187 A | 7/2008 |

OTHER PUBLICATIONS

Notification of Reason(s) for Refusal in Corresponding JP Application No. 2011-134527 dated Sep. 4, 2013, with English-language translation, 7 pps.
Chinese Office Action issued May 6, 2014, by the Chinese Patent Office in corresponding Chinese Patent No. 20121089593.1 with English Translation (27 pages).

* cited by examiner

*Primary Examiner* — Saied Ebrahimi Dehkord
(74) *Attorney, Agent, or Firm* — Buchanan Ingersoll & Rooney PC

(57) ABSTRACT

A feeder is configured to feed a recording medium. An image forming unit has a maximum sheet feed width corresponding to a longer side length of a maximum size recording medium to be accommodated in the feeder, and is disposed above the feeder in such a manner as to allow the maximum size recording medium to enter the image forming unit with a longer side first.

7 Claims, 4 Drawing Sheets

IMAGE FORMING APPARATUS

CROSS-REFERENCE TO RELATED APPLICATIONS

The present application claims priority under 35 U.S.C. §119 to Japanese Patent Application No. 2011-134527, filed Jun. 16, 2011. The contents of this application are incorporated herein by reference in their entirety.

BACKGROUND OF THE INVENTION

1. Field of the Invention

The present invention relates to an image forming apparatus.

2. Discussion of the Background

Electrographic image forming apparatuses include a feeder and an image forming unit. The feeder feeds a recording medium. The image forming unit prints a toner image corresponding to image data onto the recording medium. Generally, printing in the image forming unit is as follows. The toner image on a photoreceptor drum is electrostatically transferred onto the recording medium fed from the feeder by known electrophotography. Then, the recording medium after the transfer is conveyed to a fixing unit to be heated and pressed to have the toner image fixed onto the recording medium.

It is disclosed in each of Japanese Unexamined Patent Application Publication No. 8-328334 and Japanese Unexamined Patent Application Publication No. 2005-115084 that a width of a printable image is determined by the maximum sheet feed width of the image forming unit (the maximum value of a width direction length orthogonal to a conveyance direction of the recording medium). In order to minimize the production cost, it is common practice to set the maximum sheet feed width of the image forming unit at the same size as the size of the shorter side of a maximum recording medium accommodable in the feeder, and to feed the maximum size recording material into the image forming unit on shorter side of the maximum size recording material.

The recent growing consciousness for global environment has created a need for considering environment in relation to production activities in factories and, additionally, a need for environmental loading reduction throughout the life cycle of industrial products. However, the above-described image forming apparatus is only directed to minimizing the production cost and gives no consideration for environmental loading. Additionally, with this configuration, the period of time for printing on a maximum size recording material is as long as traveling along the longer side of the maximum size recording material. This creates a tendency toward a reduced number of printed sheets per unit time. Although this can be addressed by increasing the processing speed of the image forming apparatus, increasing its processing speed in turn increases energy consumption due to increased use of power and develops noise. This can improve environmental loading.

SUMMARY OF THE INVENTION

It is a technical task of the present invention to improve the present situation described above and provide an image forming apparatus which is capable of reducing environmental loading throughout the life cycle.

According to one aspect of the present invention, an image forming apparatus includes a feeder and an image forming unit. The feeder is configured to feed a recording medium. The image forming unit has a maximum sheet feed width corresponding to a longer side length of a maximum size recording medium to be accommodated in the feeder, and is disposed above the feeder in such a manner as to allow the maximum size recording medium to enter the image forming unit with a longer side first.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
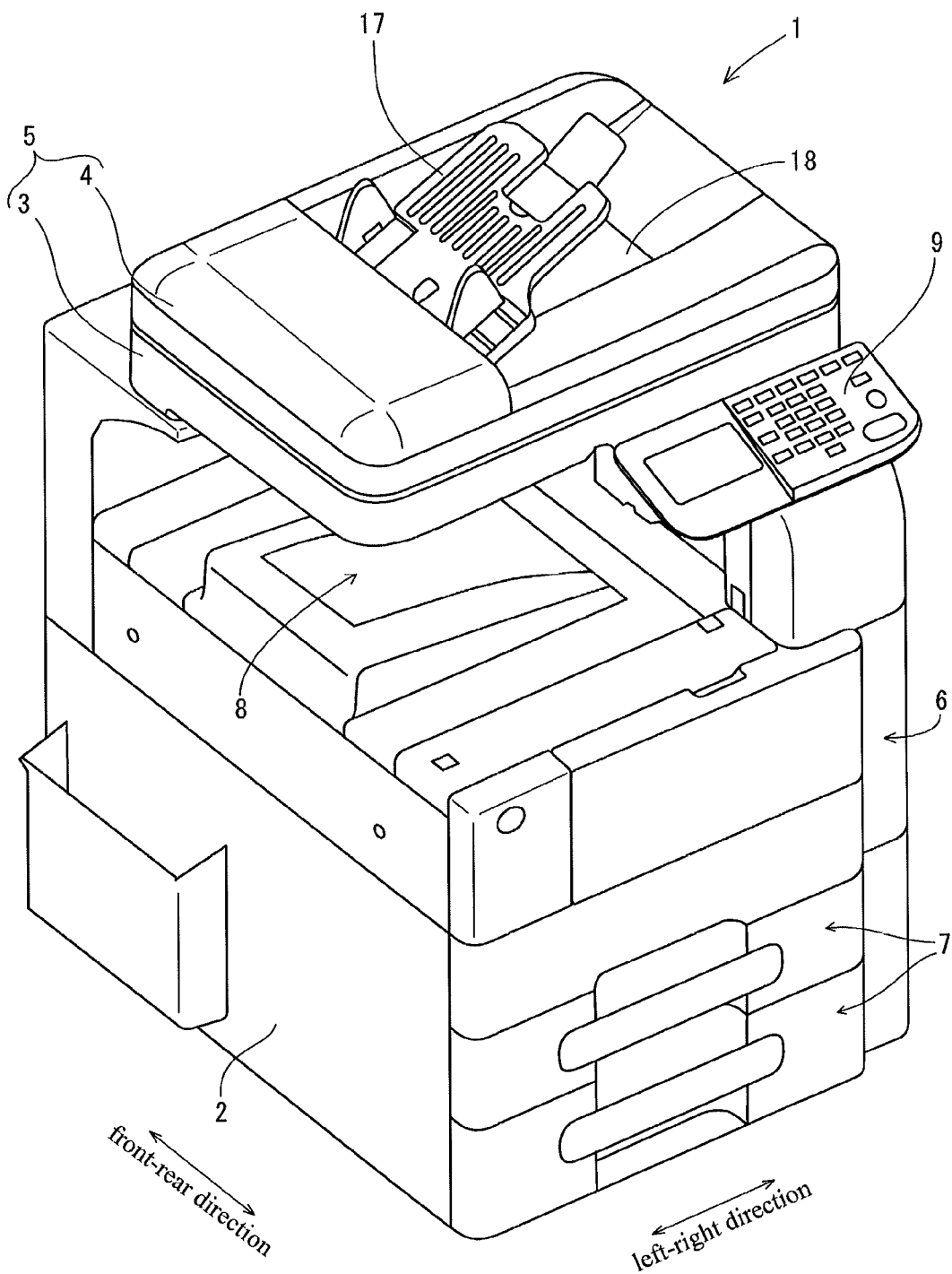
FIG. 1 is a perspective view of an MFP.

An embodiment will now be described with reference to the accompanying drawings, wherein like reference numerals designate corresponding or identical elements throughout the various drawings.

In the following description, terms (for example, "left and right" and "upper and lower") indicating specific directions and positions are used where necessary. These directions and positions are based on the front view shown in FIG. 4, which is the direction orthogonal to the paper plane. The terms are used for the sake of description and will not limit the technical scope of the present invention.

First, an overview of a multi-functional printer 1 (hereinafter, referred to as an MFP) as an example of an image forming apparatus will be described by referring to FIG. 1 to FIG. 3. The MFP 1 has multiple functions including a copying function, a scanning function, a printing function, and a facsimile function, and is capable of data communications through networks (communication networks) such as a LAN and a phone line. Specifically, the MFP 1 is capable of outputting image data read from a document to another computer through a network, or inputting image data from another computer through a network and printing the image data, or transmitting and receiving FAX data.

An image reader 5 is disposed in an upper portion of a main body 2 of the MFP 1, and includes a scanner 3 and an automatic document feeder 4 (hereinafter referred to as an ADF). The image reader 5 synchronizes the scanner 3 with the ADF 4 so as to optically read an image on each document in the ADF 4, thus acquiring image data. Specifically, the ADF 4 conveys documents to the scanner 3 one at a time, and the scanner 3 reads the image on each document when each document passes through a predetermined reading position, thus acquiring image data.

A feeder 7 that accommodates recording media P is disposed in a lower portion of the main body 2. An image forming unit 6 is disposed between the image reader 5 and the feeder 7 in the main body 2, and prints a toner image corresponding to image data onto the recording media P by known electrophotography. Thus, the image reader 5 is disposed above the image forming unit 6 that is disposed above the feeder 7. The feeder 7 supplies the recording media P to the image forming unit 6 one at a time. The image forming unit 6 prints a toner image onto the recording medium P based on image data acquired by the image reader 5 or through a network. In the main body 2, a recessed space between the image reader 5 and the image forming unit 6 serves as a discharged sheet reservoir 8. The discharged sheet reservoir 8 is where the recording medium P having a toner image printed through the image processor 6 is discharged.

An operation panel 9 as an operation unit, which includes a plurality of keys (buttons), is disposed on a front side (forward side) of the main body 2. A user operates the keys by referring to a display screen and the like on the operation panel 9 when the user executes various kinds of setting of a function selected from the various functions of the MFP 1 and instructs the MFP 1 to execute operations.

The MFP 1 is a so-called A4 compatible printer, and can store, in the feeder 7, the recording medium P of A4 size as the maximum size in a lateral feed position to enter the image forming unit 6 with a longer side first. As shown in FIG. 2 and FIG. 3, the feeder 7 includes removable sheet feed cassettes 31, and recording media P are accommodated in a frame body 31a of each sheet feed cassette 31. The sheet feed cassette 31 is disposed with the length of the frame body 31a in the conveyance direction of the recording medium P being shorter than the length of the frame body 31a in the direction orthogonal to the conveyance direction of the recording medium P. Here, the recording medium P of A4 in landscape has a longer side length L (width) of 297 mm and a shorter side length N (conveyance direction length) of 210 mm.

An inner structure of the main body 2 will be described with reference to FIG. 4 and other figures. The scanner 3 of the image reader 5 in the upper portion of the main body 2 includes a platen 11, a light source device 13, an image sensor 14, an imaging lens 15, and a mirror group 16. The platen 11 includes a platen glass 12 (see FIG. 2) on an upper surface side. The light source device 13 irradiates a document D with light. The image sensor 14 photoelectrically converts reflected light from the document D into image data. The imaging lens 15 forms an image on the image sensor 14 from the reflected light. The mirror group 16 sequentially reflects the reflected light from the document D to be incident on the imaging lens 15. The platen 11 incorporates the light source device 13, the image sensor 14, the imaging lens 15, and the mirror group 16.

To read the document D on the platen glass 12, the document D is irradiated with light from the light source device 13. The reflected light from the document D is sequentially reflected by the mirror group 16 to be incident on the imaging lens 15 that in turn forms an image on the image sensor 14 from the reflected light. The image sensor 14 performs photoelectric conversion for each pixel in accordance with the intensity of the incident light to produce an image signal (RGB signal) corresponding to the image on the document D. The image signal (RGB signal) is output to a controller 42 described later.

The ADF 4 is openably disposed on the upper surface side of the platen 11. The ADF 4 also has a function of putting the document D in close contact with the platen glass 12 by being laid on the document D on the platen glass 12. The ADF 4 includes a document placement tray 17 and a document discharge tray 18. To read the document D placed on the document placement tray 17, the document D is conveyed to a reading position by a document conveyance mechanism 19 including a plurality of rollers. During the conveyance, a portion of the document D at the reading position is irradiated with light from the light source device 13. The image is formed on the image sensor 14 from the reflected light through the mirror group 16 and the imaging lens 15. Then, the image sensor 14 converts the reflected light into the image signal (RGB signal) corresponding to the image on the document D, and outputs the image signal to the controller 42. Then, the document D is discharged onto the document discharged tray 18.

To read the document D of A4 size with the image reader 5, the document D is set to have the longer side direction aligned with the left-right direction of the main body 2 as viewed from the front. In other words, the document D is set to have the longer side direction orthogonal to the sheet feed width direction of the image forming unit 6 (front-rear direction of the main body 2). The document D on the document placement tray 17 in the ADF 4 is longitudinally fed in the left-right direction of the main body 2 with the shorter side first. Thus, the longer and shorter sides of the image reader 5 are respectively aligned with the left-right and front-rear directions of the main body 2.

Figure 4:
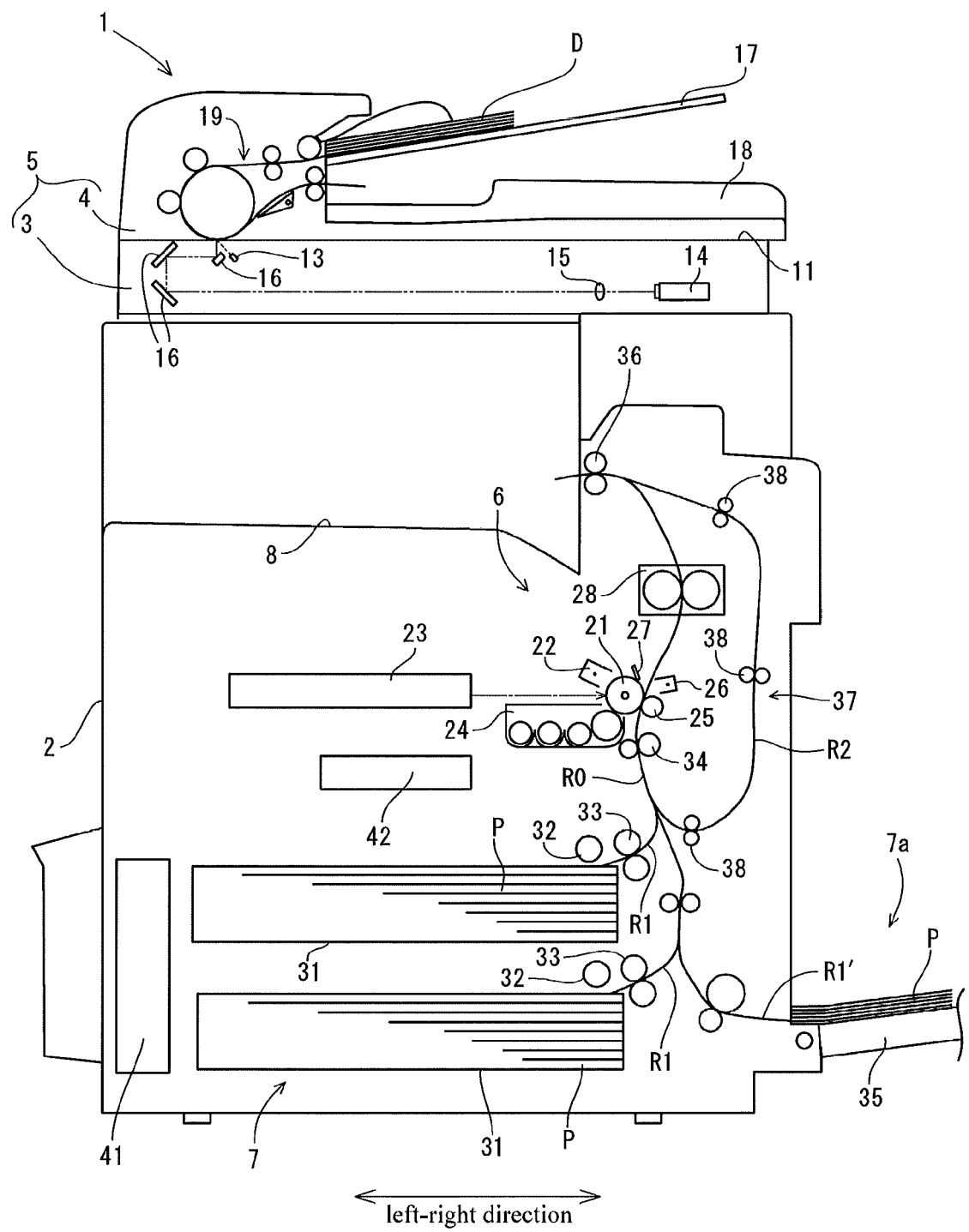
FIG. 4 is a cross-sectional front view of an inner structure of a main body.

As shown in FIG. 4, the image forming unit 6 transfers a toner image formed on a photoreceptor drum 21 onto a recording medium P through a known electrophotography, and conveys the recording medium P after the transfer to a fixing unit 28 to be heated and pressed so that the toner image is fixed onto the recording medium P. Around the photoreceptor drum 21, a charger 22, an exposing unit 23, a developer 24, a transfer roller 25, a separator 26, and a cleaner 27 are arranged in this order in the rotational direction of the photoreceptor drum 21 (in the counterclockwise direction of FIG. 4).

The charger 22 uniformly charges a surface of the photoreceptor drum 21. The exposing unit 23 forms an electrostatic latent image on the surface of the photoreceptor drum 21. The developer 24 develops the electrostatic latent image on the photoreceptor drum 21 into a toner image (visible image). The transfer roller 25 transfers the toner image on the photoreceptor drum 21 onto the recording medium P. The photoreceptor drum 21 and the transfer roller 25 define, at the position of their contact, a transfer position. The separator 26 separates the recording medium P from the photoreceptor drum 21. The cleaner 27 removes un-transferred toner remaining on the photoreceptor drum 21. The maximum sheet feed widths (the maximum value of the width direction length orthogonal to the conveyance direction of the recording medium P) of the photoreceptor drum 21, the transfer roller 25, and the like are slightly larger than the longer side length L (=297 mm) of the recording medium P of A4 in landscape. Thus, the toner image can be transferred onto the recording medium P of A4 in landscape.

The fixing unit 28 includes a fixing roller and a pressure roller. The fixing roller incorporates a fixing heater such as a halogen heater. The pressure roller is opposite the fixing roller. The fixing roller and the pressure roller define, at the portion of their contact, a fixing position. The controller 42 controls power to the fixing heater to keep the fixing heater at a temperature necessary for the fixing. The maximum sheet feed width of the fixing unit 28 is also slightly larger than the longer side length L (=297 mm) of the recording medium P of A4 in landscape. Thus, the recording medium P of A4 in landscape can be heated and pressed. The maximum sheet feed widths of the photoreceptor drum 21, the transfer roller 25, and the like, as well as the fixing unit 28 indicate that, in this embodiment, the maximum sheet feed width of the image forming unit 6 is set to allow the recording medium P of A4 in landscape to be printed.

As shown in FIG. 4, the feeder 7 includes the sheet feed cassettes 31, feeding rollers 32, pairs of separating rollers 33, and pairs of registration rollers 34. The sheet feed cassettes 31 each accommodate recording media P. The feeding rollers 32 each feed the recording media P in corresponding one of the sheet feed cassettes 31 one at a time from the top. Each pair of separating rollers 33 separates the picked part of recording media P into individual sheets. The pairs of registration rollers 34 determine the timing at which to feed the fed recording media P to the transfer position. The recording media P in each of the sheet feed cassettes 31 are fed to a main conveyance path R0 through a sheet feed path R1 one at a time from the top by the driving rotation of a corresponding set of the feeding rollers 32 and the pair of separating rollers 33. The main conveyance path R0 serves as a main path through which the recording medium P is subjected to the image forming (printing) steps. The sheet feed path R1 is provided to each of the sheet feed cassettes 31. The sheet feed paths R1 each join the main conveyance path R0 on the upstream side of the pair of registration rollers 34 in the conveyance direction.

Figure 2:
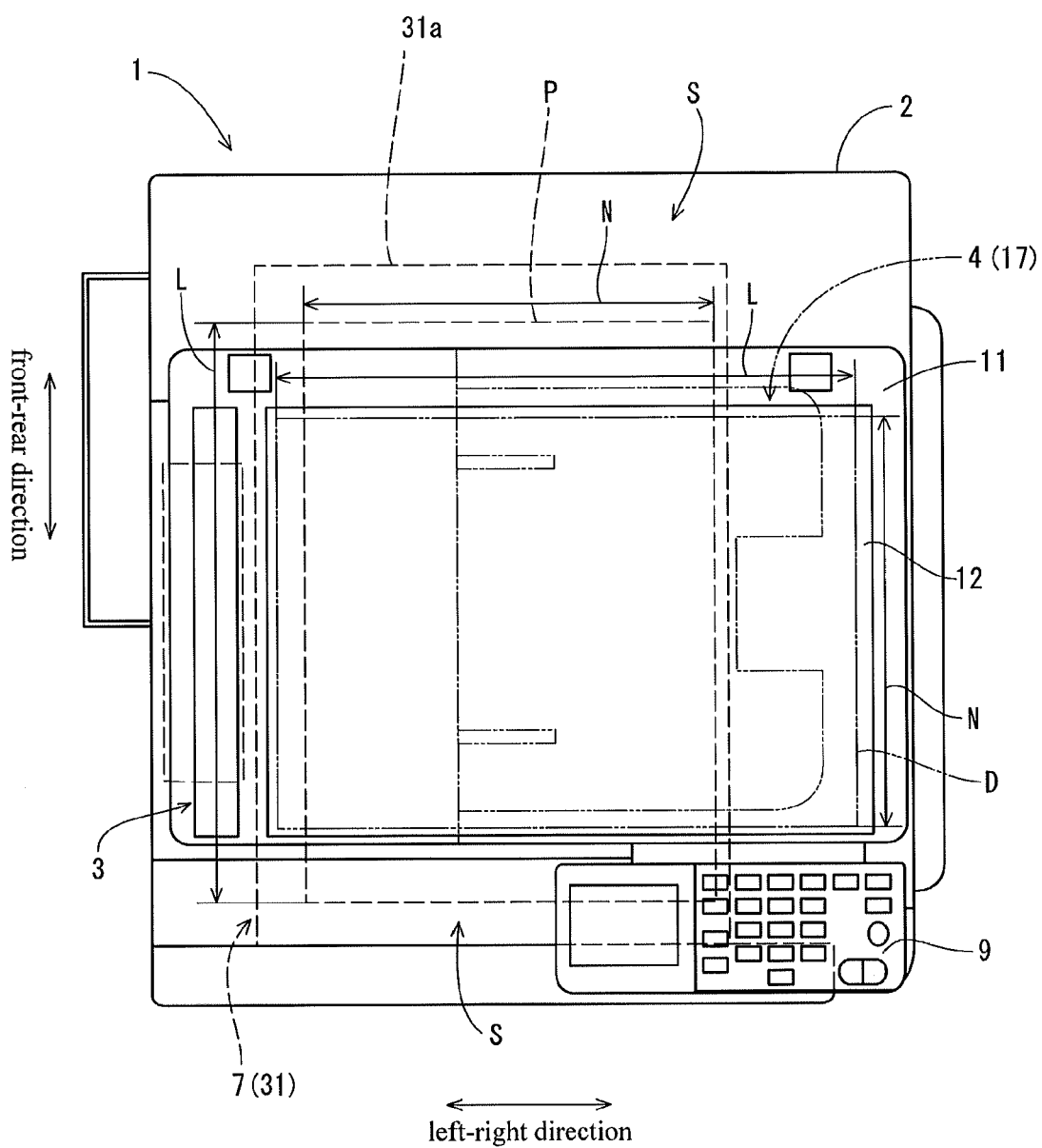
FIG. 2 is a plan view of the MFP without an ADF.
Figure 3:
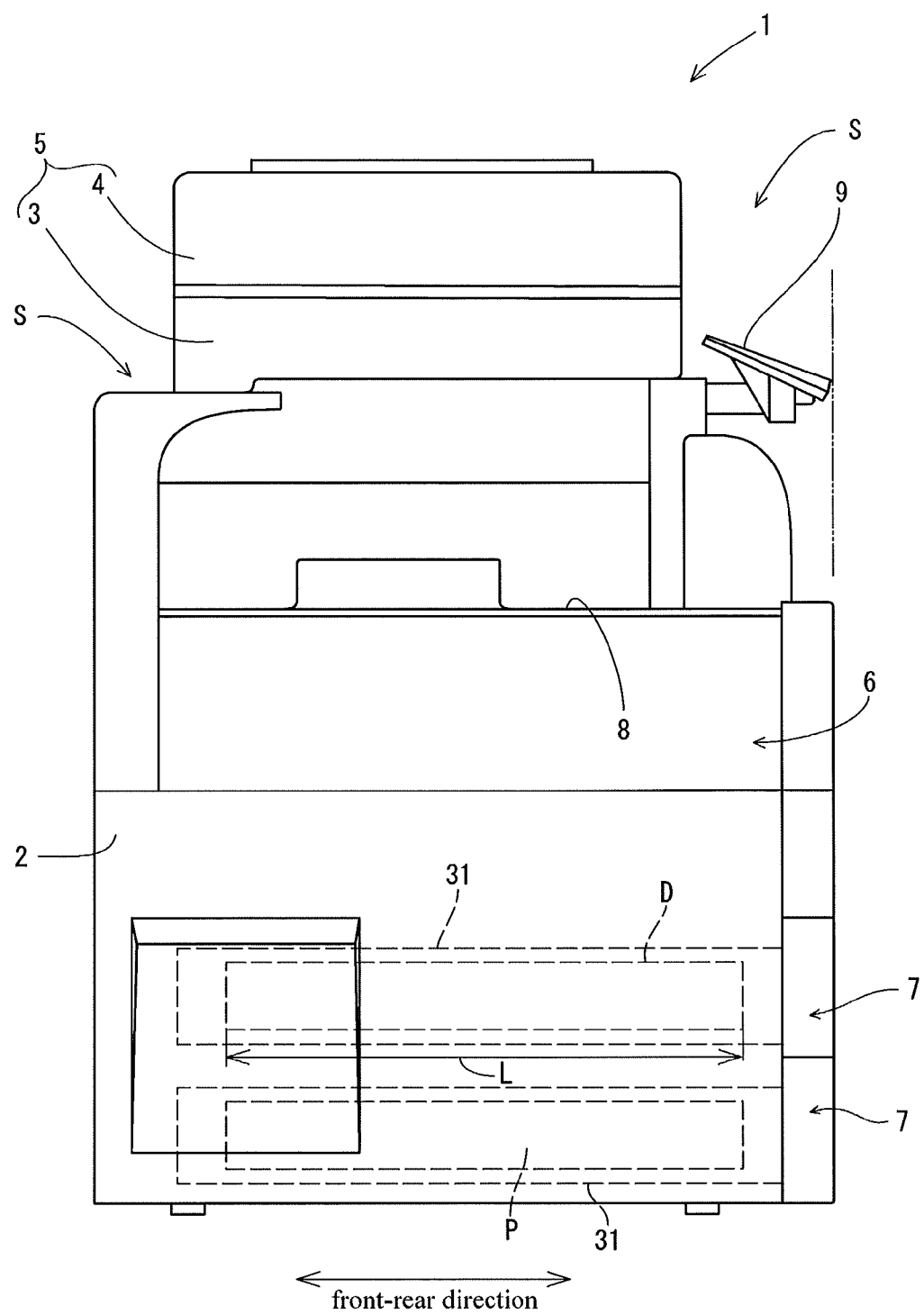
FIG. 3 is a right side view of the MFP.

As shown in FIG. 2, the longer side direction of the sheet feed cassette 31 is aligned with the front-rear direction of the main body 2. Thus, the longer side direction of the recording medium P of A4 size accommodated in the sheet feed cassette 31 is aligned with the front-rear direction of the main body 2. Accordingly, the recording medium P of A4 size is laterally fed to the image forming unit 6 with the longer side first.

As shown in FIG. 2, the longer side direction of the sheet feed cassette 31 is orthogonal to the longer side direction of the image reader 5. This also indicates that, in the main body 2, the front-rear length of the upper portion constituting the image reader 5 is shorter than the front-rear length of the lower portion incorporating the sheet feed cassettes 31 and the like. Thus, due to the appearance of the lower portion, open spaces S are respectively formed in front of and behind the upper portion in the plan view. Furthermore, in this embodiment, the operation panel 9 as an operation unit is disposed in the front open spaces S adjacent to the image reader 5 without sticking out from the outer surface of the one shorter side portion of the feeder 7 along the left-right direction of the main body 2 (forward surface portion in this embodiment) (see FIG. 3). The one shorter side portion of the feeder 7 corresponds to the one shorter side of the recording medium P of A4 size. The operation panel 9 has the front end side located more on the inner side than the forward surface of the main body 2 (feeder 7) and thus is entirely embedded in the front open spaces S.

As shown in FIG. 4, a pair of discharging rollers 36 are disposed above the image forming unit 6 that is disposed above the feeder 7. The recording medium P is conveyed vertically upward in the main conveyance path R0. Here, the image forming unit 6 is disposed above one longer side (right longer side in this embodiment) of the sheet feed cassette 31 in the front-rear direction of the main body 2. The one longer side of the sheet feed cassette 31 corresponds to one longer side of the recording medium P of A4 size. Thus, the image forming unit 6 of this embodiment is offset to the right side in the main body 2. The main conveyance path R0, the pair of discharging rollers 36, and a circulation conveyance unit 37 are also offset to the right side in the main body 2.

As shown in FIG. 4, a manual feeder 7a used as a sub-feeder includes a retractable bypass tray 35. Specifically, the bypass tray 35 through which the recording medium P of a predetermined size can be fed from outside is provided on the one side (right side in this embodiment) of the main body 2 in the left-right direction. The bypass tray 35 is provided in addition to the regular feeder 7 in the main body 2, and is pivotably mounted to be opened and closed to the one side of the main body 2 in the left-right direction. The recording media P on the bypass tray 35 is fed to the main conveyance path R0 through a manual sheet feed path R1' one at a time from the top by the driving rotation of a pickup roller and the like.

The maximum sheet feed width of the image forming unit 6 in the MFP 1 corresponds to the longer side length L of the recording medium P of A4 in landscape. Thus, the recording medium P of A3 size can be longitudinally fed through the bypass tray 35 to be printed.

The manual feeder 7a with a portion on which the recording medium P is placed defined as "placement portion" is formed to satisfy the following condition. Specifically, the length of the placement portion in the direction orthogonal to the conveyance direction of the recording medium P (that is, feeding direction) is the same as the length of the frame body 31a of the frame body 31a of the sheet feed cassette 31 in the direction orthogonal to the conveyance direction of the recording medium P.

The pair of discharging rollers 36 that discharges the printed recording medium P is disposed more on the downstream side than the fixing unit 28 in the main conveyance path R0. The printed recording medium P is discharged onto the discharged sheet reservoir 8 by driving rotation of the pair of discharging rollers 36.

The circulation conveyance unit 37 for reversing the recording medium P having the one side printed for duplex printing is disposed in the main body 2 of this embodiment. The circulation conveyance unit 37 includes a pair of reversing rollers that reverse the recording medium P having the one side printed, and pairs of duplex conveyance rollers 38. In the circulation conveyance unit 37, the recording medium P having the one side printed is reversed and is again conveyed to the pair of registration rollers 34 through a circulation conveyance path R2. Here, the pair of discharging rollers 36 is rotatable back and forth, and thus also serves as the pair of reversing rollers. The back and forth rotation of the pair of discharging rollers 36 allows the recording medium P to be discharged from the MFP 1 and to be switched back (backwardly fed) to return into the MFP 1. The upstream side of the circulation conveyance path R2 is branched off from the main conveyance path R0 at a portion between the fixing unit 28 and the pair of discharging rollers 36. The downstream side of the circulation conveyance path R2 joins the main conveyance path R0 at a portion more on the upstream side than the pair of registration rollers 34.

The image forming unit 6 is disposed on the opposite side of at least one of a power source device 41 and the controller 42 across the feeder 7. The power source device 41 controls power to the units (for example, the image reader 5, the image forming unit 6, and the feeder 7) of the main body 2. The controller 42 is in charge of overall control of operations of the units. In this embodiment, the power source device 41 is disposed on the opposite side (left side in the main body 2) of the image forming unit 6 across the feeder 7. The controller 42 is disposed above the uppermost sheet feed cassette 31. The positional relationship between the power source device 41 and the controller 42 may be reversed from that in this embodiment. For example, the power source device 41 and the controller 42 may be arranged in the front-rear direction on the opposite side (left side in the main body 2) of the image forming unit 6 across the feeder 7.

The printing by the MFP 1 will be briefly described. The MFP 1 starts printing upon receiving a start signal, the image signal, and the like. In one-surface printing, the recording medium P fed from the feeder 7 (the sheet feed cassette 31 or the bypass tray 35) is conveyed to the image forming unit 6 through the main conveyance path R0. In the image forming unit 6, the recording medium P is conveyed to the transfer position by the pair of registration rollers 34 at the timing when the forwarding end of the toner image on the photoreceptor drum 21 reaches the transfer position, and the toner image on the photoreceptor drum 21 is transferred onto the recording medium P. After the transfer, the un-transferred toner remaining on the photoreceptor drum 21 is scraped off and removed by the cleaner 27. The recording medium P loaded with an unfixed toner image on the one surface is heated and pressed through the fixing position of the fixing unit 28, and thus the unfixed toner image is fixed. The recording medium P after having the toner image fixed (after having the one surface printed) is discharged onto the discharged sheet reservoir 8. In duplex printing, the recording medium P after having the one surface printed is conveyed to the circulation conveyance path R2 for the duplex printing to be reversed and returned to the main conveyance path R0. Thus, a toner image is transferred and fixed onto the other surface of the recording medium P.

In the above described structure, the image forming unit 6 has the maximum sheet feed width corresponding to the longer side length L of the recording medium P of the maximum size to be accommodated in the feeder 7, and prints the toner image corresponding to image data onto the recording medium P. The image forming unit 6 is disposed above the feeder 7 in such a manner that the maximum size recording medium P enters the image forming unit 6 with the longer side first. Thus, the maximum size recording medium P is conveyed along the shorter side direction to be printed. Accordingly, if the process speed of the MFP 1 is the same, driving time of the image forming unit 6 and the like can be largely shortened compared with a conventional case where the recording medium P is conveyed along the longer side direction. Accordingly, energy consumed by using electricity as well as noise can be reduced, and thus, the environmental load can be reduced. Moreover, if the process speed is the same, the number of printed sheets per unit time can be increased because the time for conveyance for the shorter side length N is the only time required for printing. Furthermore, if the consumed power is the same, the process speed can be increased and the printing performance of the MFP 1 can be improved compared with the conventional case. In summary, the MFP 1 of this embodiment can reduce the environmental load throughout the life cycle compared with the conventional case with the same process speed, and can improve printing performance compared with the conventional case with the same power consumption.

Furthermore, the image reader 5 is disposed above the image forming unit 6 in such a trimmer that the longer side direction of the document D of the maximum size to be placed on the platen 11 is orthogonal to the sheet feed width of the image forming unit 6 and the longer side direction of the feeder 7. Moreover, the discharged sheet reservoir 8 where the printed recording medium P is discharged is disposed between the image reader 5 and the image forming unit 6. Thus, the open spaces S are respectively formed in front of and behind the image reader 5 in the shorter side direction due to the longer side direction of the feeder 7. Accordingly, the image reader 5 needs not to cover a large area of the discharged sheet reservoir 8, and whether the printed recording medium P is in the discharged sheet reservoir 8 can be easily confirmed visually.

The MFP 1 further includes the operation panel 9 on which the user can perform the input operation. The operation panel 9 is disposed adjacent to the image reader 5 without sticking out from the outer surface of the one shorter side portion of the feeder 7 corresponding to the one shorter side of the maximum size recording medium P. Thus, the front open space S can be utilized to dispose the operation panel 9. Furthermore, the operation panel 9 will not be in the way of a person passing by the MFP 1.

The image forming unit 6 is disposed on the opposite side of at least one of the power source device 41 and the controller 42 across the feeder 7. The power source device 41 controls power to the units in the main body 2. The controller 42 is in charge of overall control of operations of the units 5 to 7 in the main body 2. Thus, a vacant space formed on the opposite side of the image forming unit 6 across the feeder 7 can be utilized to accommodate the power source device 41 and the controller 42 because the recording medium P is conveyed with the longer side first. Thus, a wasteful space in the MFP 1 can be reduced, and the MFP 1 as a whole can be downsized.

It will be appreciated that the present invention will not be limited to the embodiment described above and can be embodied in various other forms. For example, while the MFP 1 has been described as an exemplary image forming apparatus, this should not be construed in a limiting sense. Other possible examples include printers. Moreover, the location or arrangement of individual elements in the illustrated embodiments should not be construed in a limiting sense. Various modifications can be made without departing from the scope of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus comprising:
   a feeder configured to feed a recording medium;
   an image forming unit having a maximum sheet feed width corresponding to a longer side length of a maximum size recording medium to be accommodated in the feeder, and disposed above the feeder in such a manner as to allow the maximum size recording medium to enter the image forming unit with a longer side first;
   an image reader disposed above the image forming unit in such a manner as to allow a longer side direction of a maximum size document to be placed on a platen to be orthogonal to (i) a sheet feed width direction of the image forming unit and (ii) a longer side direction of the feeder; and
   a discharged sheet reservoir where the printed recording medium is discharged, said discharged sheet reservoir being disposed between the image reader and the image forming unit,
   wherein the feeder comprises a sheet feed cassette shaped such that a longer side direction is disposed along a direction orthogonal to a conveyance direction of a recording medium, and the longer side direction of the sheet feed cassette is disposed along a front-rear direction of a main body,
   wherein the image reader has a front-rear direction length shorter than that of the feeder incorporating the sheet feed cassette therein, and
   wherein in a plan view, a first open space is formed between a front-rear direction front side of the image reader and a front-rear direction front side of the feeder, and an operation panel with a sheet feed direction width smaller than the width of the image reader is arranged in the first open space.

2. The image forming apparatus according to claim 1, wherein the image forming unit is disposed above one longer side of the feeder corresponding to the one longer side of the maximum size recording medium.

3. The image forming apparatus according to claim 2, wherein at least one of a power source device configured to supply power to the units and a controller in charge of overall control of operations of the units is disposed on an opposite side of the image forming unit across the feeder.

4. The image forming apparatus according to claim 2, wherein the feeder comprises a removable sheet feed cassette, wherein the recording medium is accommodated within a frame body of the sheet feed cassette, and wherein a length of the frame body in a conveyance direction of the recording medium is smaller than a length of the frame body in a direction orthogonal to the conveyance direction.

5. The image forming apparatus according to claim 1, further comprising an operation panel for an input operation disposed adjacent to the image reader without sticking out from an outer surface of the one shorter side portion of the feeder corresponding to the one shorter side of the maximum size recording medium.

6. The image forming apparatus of claim 1, wherein a second open space is formed between a front-rear direction rear side of the image reader and a front-rear direction rear side of the feeder.

7. The image forming apparatus of claim 1, wherein the operation panel arranged in the first open space is fixed to a support member, said operation panel and said support member extending along only a portion of the image reader in a side-to-side direction such that neither the support member nor the operation panel extends along an entire side length of the image reader.

* * * * *